United States Patent
Ata et al.

(10) Patent No.: US 12,397,417 B2
(45) Date of Patent: Aug. 26, 2025

(54) LEARNING DEVICE, DIAGNOSTIC SYSTEM, AND MODEL GENERATION METHOD TO DIAGNOSE ABNORMALITY BASED ON TEMPERATURE MEASUREMENT IN A PRODUCTION FACILITY

(71) Applicant: Mitsubishi Electric Corporation, Tokyo (JP)

(72) Inventors: Daiki Ata, Tokyo (JP); Tomo Ikuyama, Tokyo (JP); Satoshi Namematsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 458 days.

(21) Appl. No.: 17/915,112

(22) PCT Filed: Dec. 18, 2020

(86) PCT No.: PCT/JP2020/047532
§ 371 (c)(1),
(2) Date: Sep. 28, 2022

(87) PCT Pub. No.: WO2022/130640
PCT Pub. Date: Jun. 23, 2022

(65) Prior Publication Data
US 2023/0153983 A1    May 18, 2023

(51) Int. Cl.
*B25J 9/16*        (2006.01)
*G01K 1/143*       (2021.01)
(Continued)

(52) U.S. Cl.
CPC ............ *B25J 9/163* (2013.01); *B25J 9/1612* (2013.01); *G01K 1/143* (2013.01); *G05B 23/024* (2013.01);
(Continued)

(58) Field of Classification Search
CPC ..... G06T 7/0008; B25J 9/1612; B25J 9/1697; B25J 9/163; G01K 1/143; G05B 23/024;
(Continued)

(56) References Cited

U.S. PATENT DOCUMENTS 8,996,175 B2 * 3/2015 Blumberg ............. G05B 19/42
901/3
9,199,376 B2 * 12/2015 Wells .................... B25J 9/1612
(Continued)

FOREIGN PATENT DOCUMENTS

JP    2017-167847 A    9/2017
JP    2017-199074 A    11/2017
(Continued)

OTHER PUBLICATIONS

International Search Report and Written Opinion mailed on Mar. 9, 2021, received for PCT Application PCT/JP2020/047532, filed on Dec. 18, 2020, 11 pages including English Translation.
(Continued)

*Primary Examiner* — Michael P LaPage
(74) *Attorney, Agent, or Firm* — XSENSUS LLP (57) ABSTRACT

A learning device and other techniques allow accurate diagnosis of a production facility. A learning device (10) includes a data acquirer that acquires data for learning, and a model generator that generates a learning model for inferring a condition of a workpiece (3) handled in a production facility (2) on the basis of the data for learning. The data for learning includes setting data indicating a setting of the production facility (2), image data indicating an image of the production facility (2) captured by a camera (4), temperature data indicating a surface temperature of the production facility (2) measured by a temperature sensor (5), distance data indicating a distance from a range sensor (6) to the production facility (2) measured by the range sensor (6), and condition data indicating the condition of the workpiece (3) handled in the production facility (2).

5 Claims, 10 Drawing Sheets

(51) Int. Cl.
  *G05B 23/02* (2006.01)
  *G06T 7/00* (2017.01)
  *G01J 5/00* (2022.01)
(52) U.S. Cl.
  CPC ..... *G06T 7/0008* (2013.01); *G01J 2005/0077* (2013.01)
(58) Field of Classification Search
  CPC ......... G05B 2219/40607; G06V 10/70; G06V 2201/06; G01J 2005/0077; Y02P 90/02
  See application file for complete search history.

(56) References Cited

U.S. PATENT DOCUMENTS

| | | |
|---|---|---|
| 2017/0308049 A1 | 10/2017 | Fujii et al. |
| 2018/0203439 A1 | 7/2018 | Hattori et al. |
| 2018/0203961 A1 | 7/2018 | Aisu et al. |
| 2019/0176348 A1* | 6/2019 | Bingham ............... B25J 9/1612 |
| 2019/0295238 A1* | 9/2019 | Sakai ...................... G06T 7/001 |
| 2019/0317476 A1* | 10/2019 | Miyagi ............ G05B 19/41875 |
| 2020/0398423 A1* | 12/2020 | Hane ...................... B25J 13/085 |
| 2021/0229279 A1* | 7/2021 | Colbrunn ............... B25J 9/1653 |
| 2021/0331318 A1* | 10/2021 | Hwang ................... B25J 9/1651 |

FOREIGN PATENT DOCUMENTS

| | | |
|---|---|---|
| JP | 2018-116545 A | 7/2018 |
| WO | 2018/105296 A1 | 6/2018 |
| WO | 2019/187228 A1 | 10/2019 |
| WO | WO-2020242065 A1 * | 12/2020 .......... B25J 11/0045 |

OTHER PUBLICATIONS

Office Action dated Apr. 9, 2025, issued in corresponding CN patent application No. 202080099225.0 (15 pages; with English translation).

* cited by examiner

| DATE AND TIME | CLASSIFICATION | DETAILS |
|---|---|---|
| 2020/10/30 06:30:00 (SETTING DATE AND TIME) | SENSOR SETTING | SUPPLY VOLTAGE: DC 12 V, AMPLIFICATION RATIO: 4.5, ... |
| | ACTUATOR SETTING | SUPPLY VOLTAGE: AC 240 V, FREQUENCY: 60Hz, ... |
| 2020/10/30 13:34:25 (ACQUISITION DATE AND TIME) | IMAGE DATA | ... |
| | TEMPERATURE DATA | ... |
| | DISTANCE DATA | ... |
| 2020/10/30 13:34:25 (HANDLING DATE AND TIME) | CONDITION DATA | SCRATCHES ON BOTH SIDE SURFACES |

| DATE AND TIME | CLASSIFICATION | DETAILS |
|---|---|---|
| 2020/10/30 06:30:00 (SETTING DATE AND TIME) | SENSOR SETTING | SUPPLY VOLTAGE: DC 12 V, AMPLIFICATION RATIO: 4.5, ... |
| | ACTUATOR SETTING | SUPPLY VOLTAGE: AC 240 V, FREQUENCY: 60Hz, ... |
| 2020/10/30 13:34:25 (ACQUISITION DATE AND TIME) | IMAGE DATA | ... |
| | TEMPERATURE DATA | ... |
| | DISTANCE DATA | |
| | HISTORICAL DATA | OPERATION START DATE AND TIME: 2020/10/30 06:33:00 OPERATION HOURS: 7 H 1 MIN 25 S OPERATION COUNT: 500 ... |
| | ENVIRONMENTAL DATA | TEMPERATURE: 23°C, HUMIDITY: 18% ILLUMINANCE: 900 LUX, ... |
| 2020/10/30 13:34:25 (HANDLING DATE AND TIME) | CONDITION DATA | SCRATCHES ON BOTH SIDE SURFACES |
| ... | | |

LEARNING DEVICE, DIAGNOSTIC SYSTEM, AND MODEL GENERATION METHOD TO DIAGNOSE ABNORMALITY BASED ON TEMPERATURE MEASUREMENT IN A PRODUCTION FACILITY

CROSS-REFERENCE TO RELATED APPPLICATION

The present application is based on PCT filing PCT/JP2020/047532, filed Dec. 18, 2020, the entire contents of which are incorporated herein by reference.

TECHNICAL FIELD

The present disclosure relates to a learning device, an inference device, a diagnostic system, a model generation method, and a program.

BACKGROUND ART

At production sites, production facilities, such as robotic arms and belt conveyors, handle workpieces through, for example, machining or transporting workpieces to produce products.

An abnormality in such production facilities can cause failures in workpieces, such as incorrect machining during machining or damage to workpieces during transportation. The production continued with an abnormality in the production facilities without being noticed can produce numerous defective products. Techniques for diagnosing production facilities are thus awaited.

Patent Literature 1 describes a technique for generating a learning model on the basis of the state of a manufacturing machine, an environment around the manufacturing machine, and the inspection results of manufactured products, and identifying variables associated with an abnormality on the basis of the generated learning model when defective products are produced. Once such variables associated with an abnormality are identified, the control over the manufacturing machine can be changed on the basis of, for example, the variables to reduce defective products.

CITATION LIST

Patent Literature

Patent Literature 1: Unexamined Japanese Patent Application Publication No. 2017-199074

SUMMARY OF INVENTION

Technical Problem

The technique in Patent Literature 1 does not use information acquired through external observation of the manufacturing machine and thus may not accurately identify variables associated with an abnormality. When, for example, the arm and the sensor included in the manufacturing machine are both misaligned, the technique in Patent Literature 1 may not accurately identify variables associated with the abnormality. In other words, the technique in Patent Literature 1 can be less accurate in diagnosing the production facilities.

In response to the above issue, an objective of the present disclosure is to provide a learning device and other techniques that allow accurate diagnosis of a production facility.

Solution to Problem

To achieve the above objective, a learning device according to an aspect of the present disclosure includes learning data acquisition means for acquiring data for learning, and model generation means for generating a learning model for inferring a condition of a workpiece handled in a production facility on the basis of the data for learning. The data for learning includes setting data indicating a setting of the production facility, image data indicating an image of the production facility captured by an imaging device, temperature data indicating a surface temperature of the production facility measured by a temperature sensor, distance data indicating a distance from a range sensor to the production facility measured by the range sensor, and condition data indicating the condition of the workpiece handled in the production facility.

Advantageous Effects of Invention

The technique according to the above aspect of the present disclosure allows accurate diagnosis of a production facility.

DESCRIPTION OF EMBODIMENTS

A diagnostic system according to one or more embodiments of the present disclosure is described with reference to the drawings. In the drawings, the same reference signs denote the same or corresponding components.

Embodiment 1

A diagnostic system 1 according to Embodiment 1 is described with reference to FIG. 1. The diagnostic system 1 diagnoses a production facility 2 installed at a production site F. The diagnostic system 1 includes the production facility 2, a camera 4, a temperature sensor 5, a range sensor 6, an inspection device 7, a learning device 10, an inference device 20, and a data server 30. The production facility 2, the camera 4, the temperature sensor 5, the range sensor 6, the inspection device 7, the learning device 10, and the inference device 20 are each connected to the data server 30 to allow communication. The diagnostic system 1 is an example of a diagnostic system in an aspect of the present disclosure.

The learning device 10, the inference device 20, and the data server 30 are installed, for example, in a control room at the production site F at a factory. The production facility 2, the camera 4, the temperature sensor 5, the range sensor 6, and the inspection device 7 are connected to the data server 30, for example, through a factory network. The learning device 10 and the inference device 20 are connected to the data server 30, for example, through a local network in the control room.

The production facility 2 is installed at the production site F and handles a workpiece 3 for producing a product. The operation of the production facility 2, such as machining the workpiece 3 or transporting the workpiece 3 is collectively referred to as the production facility 2 handling the workpiece 3. The production facility 2 includes production machines, such as a robotic arm, a machining module, and a belt conveyor. The production facility 2 is connected to the data server 30 to allow communication and transmits the setting data about the production facility 2 to the data server 30 as appropriate. The setting data indicates, for example, the parameter settings of the sensors and actuators included in the production facility 2. The production facility 2 is an example of a production facility in an aspect of the present disclosure.

Figure 1:
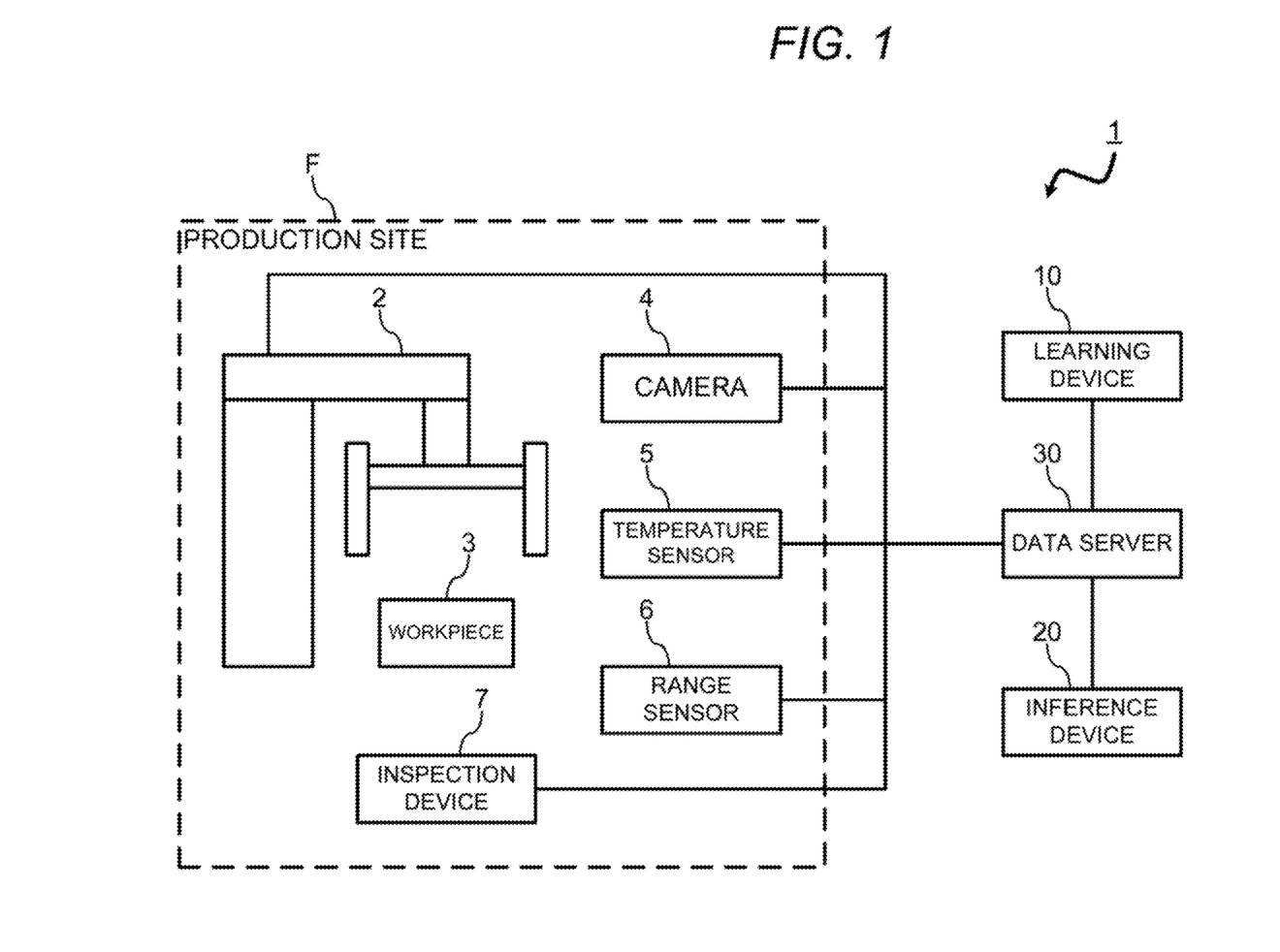
FIG. 1 is a diagram of a diagnostic system according to Embodiment 1 of the present disclosure illustrating an overall configuration.

In the example illustrated in FIG. 1, the production facility 2 includes a robotic arm that can grip and transport the workpiece 3. The production facility 2 can grip the workpiece 3 on the side surfaces of the workpiece 3 with a movable hand at the end of the robotic arm. More specifically, the production facility 2 lowers the hand to the side surfaces of the workpiece 3 with the hand wider than the width of the workpiece and then closes the hand to grip the workpiece 3.

An abnormality may occur in the hand of the robotic arm in the production facility 2. The hand cannot be expanded beyond the width of the workpiece. In this case, when the hand is lowered to the side surfaces of the workpiece 3 as illustrated in, for example, FIG. 2, the hand rubs and scratches the workpiece 3. The arrow in FIG. 2 indicates the hand lowered to the side surfaces of the workpiece 3, and the zigzag lines indicate the positions of the workpiece 3 and the hand rubbing against each other. When the production continues without such an abnormality being detected in the production facility 2, many defective products may be produced. Thus, the diagnostic system 1 is to diagnose any such abnormality in the production facility 2.

The camera 4 is installed at the production site F. The camera 4 captures an image of the production facility 2 and transmits image data indicating the captured image to the data server 30. The camera 4 is, for example, a digital camera including a lens and an image sensor. The camera 4 is an example of an imaging device in an aspect of the present disclosure.

The temperature sensor 5 is installed at the production site F. The temperature sensor 5 measures the surface temperature of the production facility 2 and transmits temperature data indicating the surface temperature to the data server 30. The temperature sensor 5 is, for example, a thermal image sensor that can acquire a thermal image of the production facility 2 by receiving infrared light. When the temperature sensor 5 is a thermal image sensor, the thermal image of the production facility 2 indicates the surface temperature distribution of the production facility 2. In other words, the temperature data indicates the surface temperature distribution of the production facility 2. The temperature sensor 5 is an example of a temperature sensor in an aspect of the present disclosure.

The range sensor 6 is installed at the production site F. The range sensor 6 measures the distance from the range sensor 6 to the production facility 2 and transmits distance data indicating the distance to the data server 30. The range sensor 6 is, for example, a light detection and ranging (LiDAR) sensor that emits a laser beam and receives reflected light from the emitted laser beam to measure the distance from the range sensor 6 to each part of the production facility 2 on the basis of the received reflected light. When the range sensor 6 is a LiDAR sensor, the distance data indicates the depth image of the production facility 2. The range sensor 6 is an example of a range sensor in an aspect of the present disclosure.

Figure 3:
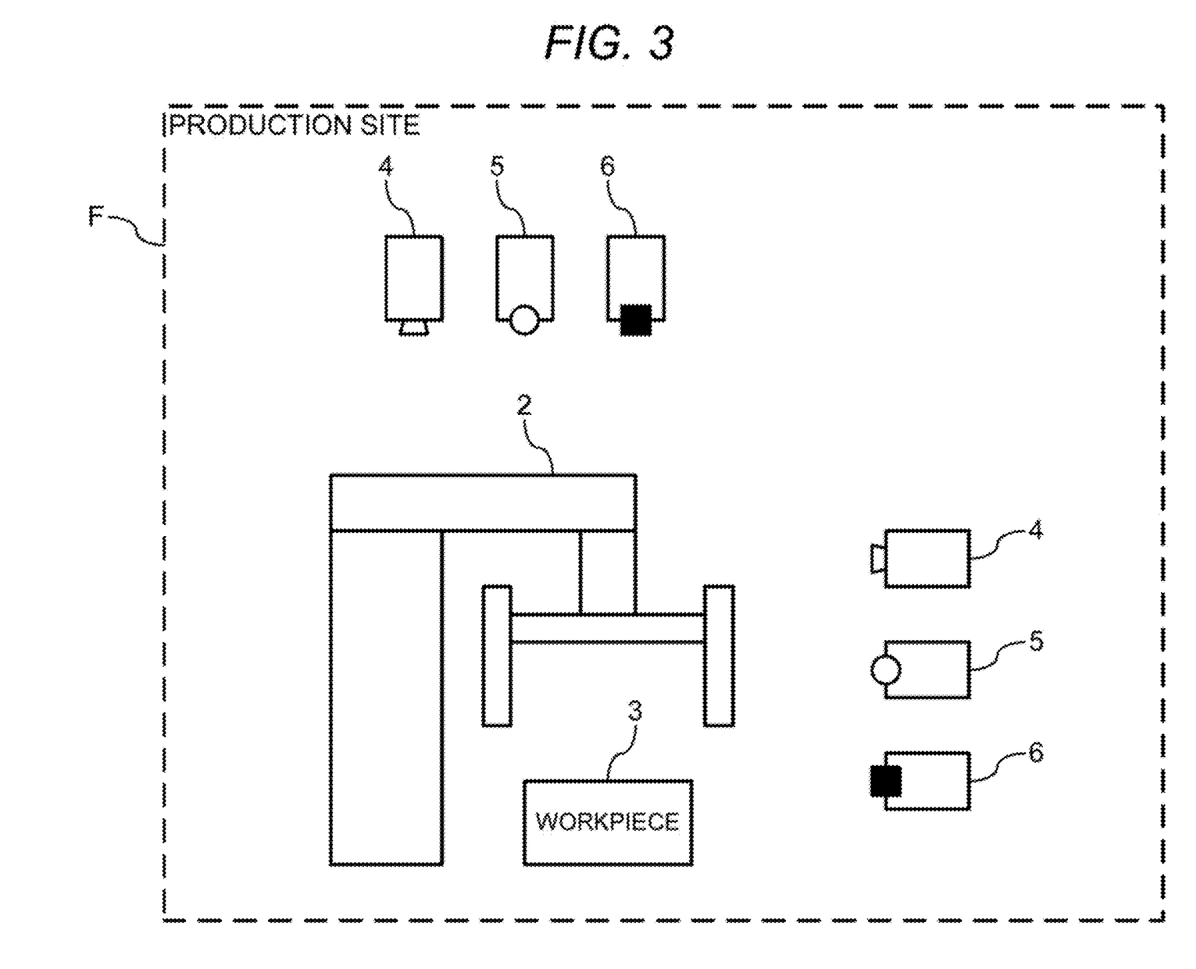
FIG. 3 is a diagram of an example production facility being sensed in multiple directions in Embodiment 1 of the present disclosure.

Although FIG. 1 illustrates the single camera 4, the single temperature sensor 5, and the single range sensor 6, multiple sets of cameras 4, temperature sensors 5, and range sensors 6 may be installed at the production site F to sense the production facility 2 in multiple directions with the multiple sets of cameras 4, temperature sensors 5, and range sensors 6 as illustrated in FIG. 3. The production facility 2 being sensed in multiple directions improves the accuracy of the model generated in the model generation (described later) and also improves the accuracy of the diagnosis.

When the camera 4, the temperature sensor 5, and the range sensor 6 transmit image data, temperature data, and distance data to the data server 30, the camera 4, the temperature sensor 5, and the range sensor 6 also transmit data indicating the date and time when these sets of data are acquired to the data server 30.

The inspection device 7 extracts and inspects selected workpieces 3 handled in the production facility 2. The inspection device 7 extracts and inspects, for example, one workpiece 3 for every twenty workpieces 3 handled in the production facility 2. The inspection device 7 inspects the workpiece 3 to determine whether the condition of the workpiece 3 is acceptable or defective and transmits condition data indicating whether the condition of the workpiece 3 is acceptable or defective to the data server 30. The inspection device 7, for example, captures an image of the extracted workpiece 3 and compares the captured image of the workpiece 3 with a prepared image of a product with a satisfactory condition to inspect the workpiece 3.

The condition data indicating whether the condition of the workpiece 3 is acceptable or defective may simply be binary data indicating whether the condition of the workpiece 3 is acceptable or defective or may include data including the basis for the determination as to whether the condition of the workpiece 3 is acceptable or defective. When, for example, the inspection device 7 inspects a workpiece 3 and detects any scratch on the workpiece 3, the condition data may simply be data indicating that the workpiece is defective or may be data indicating that the workpiece has a scratch, or may be data specifically indicating the position of the scratch.

When the inspection device 7 transmits the condition data to the data server 30, the inspection device 7 also transmits data indicating the date and time when the inspected workpiece 3 is handled in the production facility 2 to the data server 30. This is to identify a point in time at which the condition data is handled for the workpiece 3.

Figure 4:
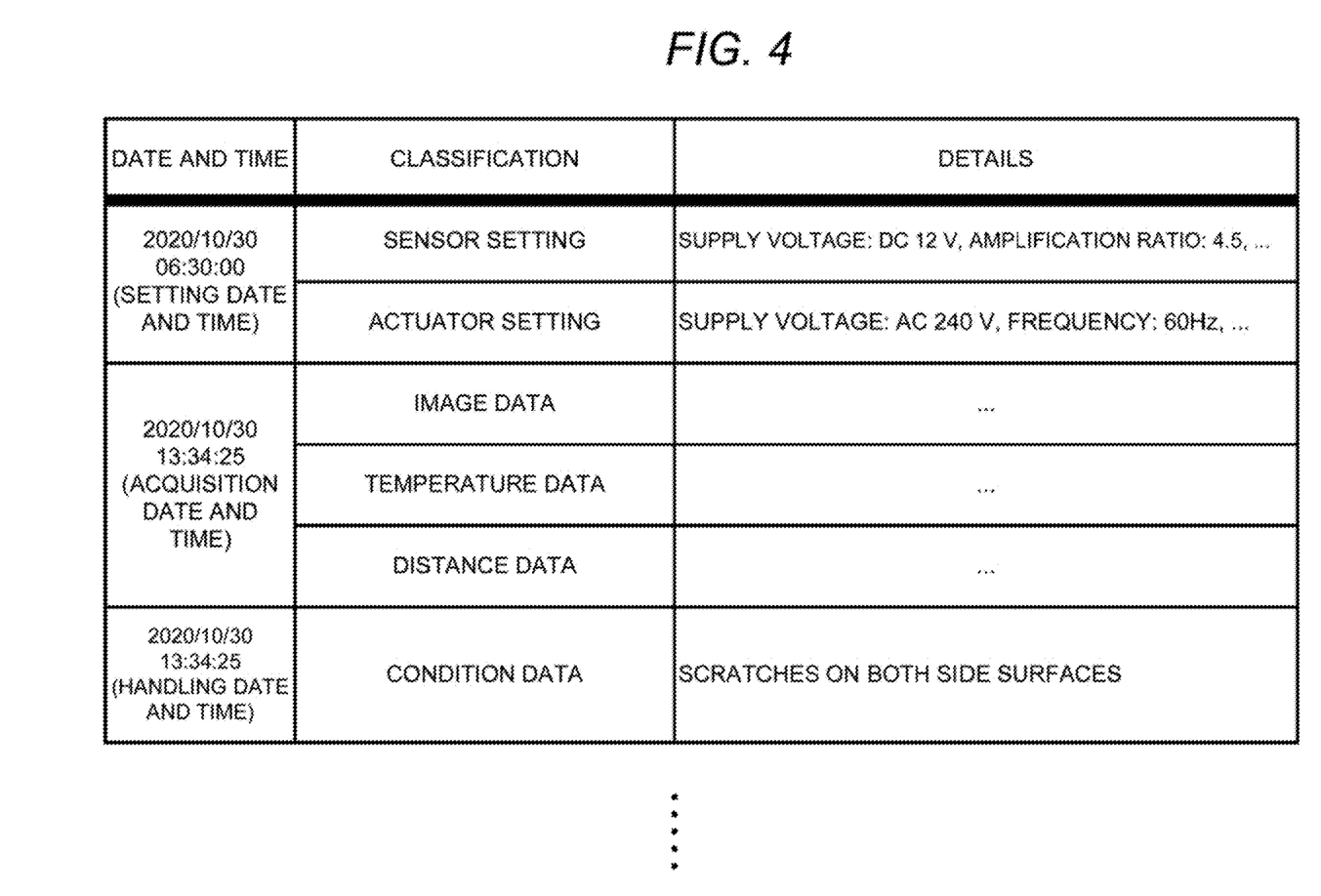
FIG. 4 is a diagram illustrating an example of data stored in a data server in Embodiment 1 of the present disclosure.

The data server 30 stores setting data received from the production facility 2, image data received from the camera 4, temperature data received from the temperature sensor 5, distance data received from the range sensor 6, and condition data received from the inspection device 7. The data server 30 also stores the above time-related data transmitted together with these sets of data. The data stored in the data server 30, for example, is illustrated in FIG. 4. In addition to the various sets of data described above, the data server 30 also stores a learning model (described later) that is generated by the learning device 10. The data server 30 transmits the stored learning model to the inference device 20.

The data server 30 transmits the data for learning including the setting data, the image data, the temperature data, the distance data, and the condition data to the learning device 10. The data server 30 transmits the data for inference including the setting data, the image data, the temperature data, and the distance data to the inference device 20. The details of learning and inference are described later.

The learning device 10 generates, through machine learning, a learning model for inferring the condition of the workpiece 3 handled in the production facility 2 on the basis of the data for learning received from the data server 30 including the setting data, the image data, the temperature data, the distance data, and the condition data. The learning device 10 can generate a learning model with high accuracy, particularly because the learning model is generated on the basis of the image data, the temperature data, and the distance data that is data acquired through external observation of the production facility 2. The learning device 10 transmits the generated learning model to the data server 30 to be stored. The functional components of the learning device 10 are described later. The learning device 10 is an example of a learning device in an aspect of the present disclosure.

An accurate learning model can be acquired on the basis of the data acquired through external observation of the production facility 2. This is described schematically with reference back to the example illustrated in FIG. 2. As described above, the hand of the robotic arm in the production facility 2 has rubbed the workpiece 3 in FIG. 2. When the hand has rubbed the workpiece 3, frictional heat is generated on the surface of the hand. As a result, the surface temperature of the hand increases. The increased surface temperature is measured by the temperature sensor 5. The data for learning includes data indicating the increased surface temperature. The learning device 10 thus learns to associate the defective workpiece with the increased surface temperature of the hand. Thus, the learning model is more accurate than when the learning model is generated without using data acquired through external observation of the production facility 2.

Figure 2:
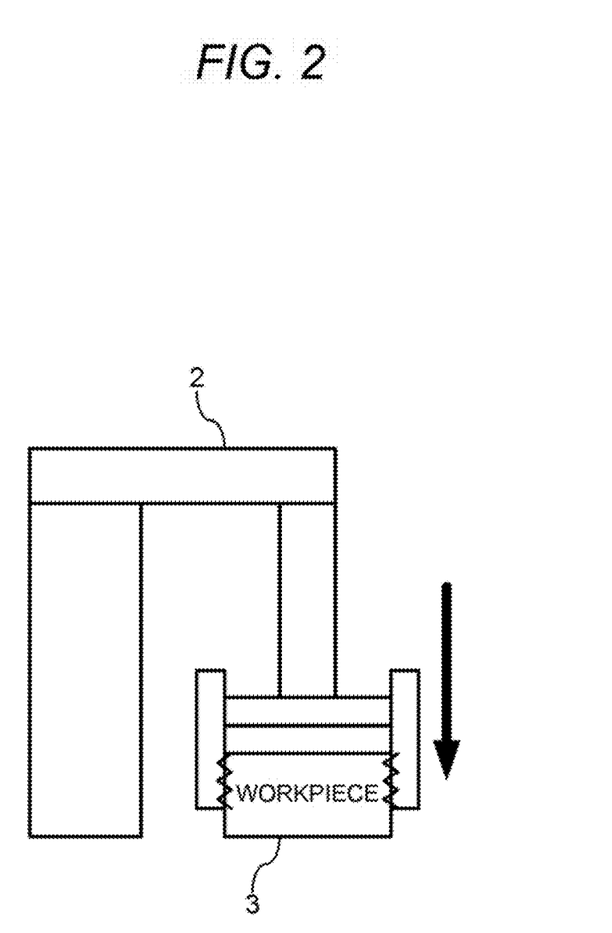
FIG. 2 is a diagram of an example production facility with an arm rubbing a workpiece in Embodiment 1 of the present disclosure.

In FIG. 2, an abnormality occurs and the hand cannot be expanded. The image data indicating the image captured by the camera 4 and the distance data indicating the distance measured by the range sensor 6 may thus also reflect the abnormality. Thus, the learning model with high accuracy can be acquired by generating the learning model using data acquired through external observation of the production facility 2.

The inference device 20 infers the condition of the workpiece 3 handled in the production facility 2 on the basis of the data for inference received from the data server 30, including the setting data, the image data, the temperature data, and the distance data, and the learning model generated by the learning device 10. When the workpiece is inferred to be defective, an abnormality is expected to be in the production facility 2. Unlike the data for learning, the data for inference does not include condition data. The inference device 20 can thus infer the condition of the workpieces 3 that each are not an inspection object for the inspection device 7. The functional components of the inference device 20 are described later. The inference device 20 is an example of an inference device in an aspect of the present disclosure.

The functional components of the learning device 10 are described with reference to FIG. 5. The learning device 10 includes a communicator 11, a data acquirer 12, and a model generator 13.

The communicator 11 communicates with the data server 30. The communicator 11 particularly receives the data for learning from the data server 30, transmits the data to the data acquirer 12, receives the learning model from the model generator 13, and transmits the learning model to the data server 30. The communicator 11 is, for example, a network interface corresponding to a factory network or a local network.

The data acquirer 12 acquires the data for learning including the setting data, the image data, the temperature data, the distance data, and the condition data from the data server 30 through the communicator 11. The data for learning includes the image data, the temperature data, the distance data, and the condition data in which the acquisition date and time associated with the image data, the temperature data, and the distance data match the handling date and time associated with the condition data, as also illustrated in, for example, FIG. 4. Such data for learning is data about one workpiece 3 that is handled. The data acquirer 12 is an example of learning data acquisition means in an aspect of the present disclosure.

The model generator 13 generates a learning model for inferring the condition of the workpiece 3 handled in the production facility 2 on the basis of the data for learning acquired by the data acquirer 12. The model generator 13 also transmits the generated learning model to the data server 30 to be stored through the communicator 11. The model generator 13 is an example of model generation means in an aspect of the present disclosure.

The model generator 13 generates the learning model through machine learning. Various learning methods, such as supervised learning, unsupervised learning, reinforcement learning, and semi-supervised learning, can be used as the machine learning methods. When, for example, supervised learning is used, the model generator 13 learns with the setting data, the image data, the temperature data, and the distance data as input and the condition data as output to generate the learning model for inferring the condition of the workpiece 3 handled in the production facility 2. When, for example, unsupervised learning is used, the model generator 13 learns with all learning data including the condition data as input to cluster the data for learning and generate the learning model for inferring the condition of the workpiece 3 handled in the production facility 2. Each of the above machine learning methods may be combined with, for example, deep learning.

The functional components of the inference device 20 are described with reference to FIG. 6. The inference device 20 includes a communicator 21, a data acquirer 22, an inferrer 23, and an informer 24.

The communicator 21 communicates with the data server 30. The communicator 21 particularly receives the data for inference and the learning model from the data server 30 and transmits the data for inference and the learning model to the data acquirer 22. The communicator 21 is, for example, a network interface corresponding to a factory network or a local network.

The data acquirer 22 acquires the data for inference including the setting data, the image data, the temperature data, and the distance data from the data server 30 through the communicator 21. As described above, the data for inference does not include the condition data. The data acquirer 22 acquires the learning model from the data server 30 through the communicator 21. The data acquirer 22 is an example of inference data acquisition means in an aspect of the present disclosure.

The inferrer 23 infers the condition of the workpiece 3 handled in the production facility 2 on the basis of the data for inference and the model for learning acquired by the data acquirer 22. The inferrer 23 controls the informer 24 on the basis of the inference result to inform the user of the diagnosis result of the production facility 2. The user is, for example, an administrator of the diagnostic system 1. When, for example, the inferrer 23 infers that the condition of the workpiece 3 handled in the production facility 2 is acceptable or defective, the inferrer 23 controls the informer 24 to inform the user of the diagnosis result indicating no abnormality or an abnormality in the production facility 2. When the workpiece 3 is defective, the cause of the defect is likely to be an abnormality in the production facility 2. The condition of the workpiece 3 can thus be associated with the normal or abnormal state of the production facility 2. The workpiece 3 may be defective although the production facility 2 is normal. The inferrer 23 may thus inform the user of the diagnosis result indicating that the production facility 2 is abnormal simply when, for example, the number of workpieces 3 determined to be defective reaches a predetermined value or greater. The inferrer 23 is an example of inference means in an aspect of the present disclosure.

The informer 24 informs the user of the diagnosis result of the production facility 2 on the basis of the control of the inferrer 23. The informer 24 is, for example, a display. In this case, the informer 24 reports the diagnosis result by displaying, for example, texts or icons on the display. In some embodiments, the informer 24 may include a green lamp and a red lamp. In this case, the informer 24 lights a green lamp when the diagnosis result indicates being normal and a red lamp when the diagnosis result indicates being abnormal to report the diagnosis result.

Figure 7:
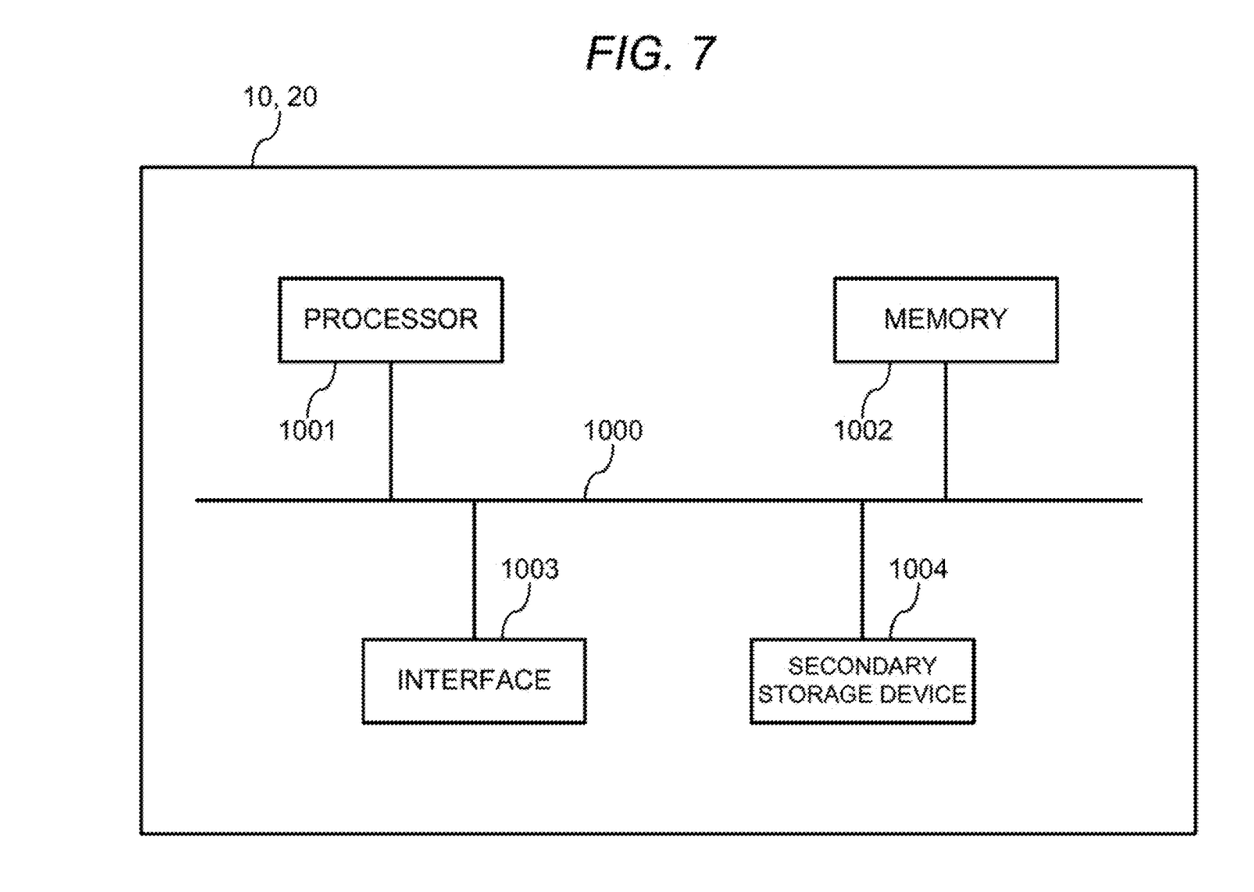
FIG. 7 is a diagram of the learning device and the inference device according to Embodiment 1 of the present disclosure illustrating the example hardware configuration.

An example hardware configuration of the learning device 10 and the inference device 20 is described with reference to FIG. 7. The learning device 10 and the inference device 20 illustrated in FIG. 7 are implemented by, for example, a computer such as a personal computer or a microcontroller.

The learning device 10 and the inference device 20 each include a processor 1001, a memory 1002, an interface 1003, and a secondary storage device 1004 that are connected to each other with a bus 1000.

The processor 1001 is, for example, a central processing unit (CPU). Each function of the learning device 10 and the inference device 20 is implemented by the processor 1001 that reads the operation program stored in the secondary storage device 1004 into the memory 1002 and executes the operation program.

The memory 1002 is a main memory device including, for example, a random-access memory (RAM). The memory 1002 stores the operation program read by the processor 1001 from the secondary storage device 1004. The memory 1002 serves as a working memory when the processor 1001 executes the operation program.

The interface 1003 is an input-output (I/O) interface, such as a serial port, a universal serial bus (USB) port, or a network interface. The interface 1003 implements the functions of the communicator 11 and the communicator 21. The functions of the informer 24 are implemented by connecting, for example, a display or lamps to the interface 1003.

The secondary storage device 1004 is, for example, a flash memory, a hard disk drive (HDD), or a solid state drive (SSD). The secondary storage device 1004 stores the operation program to be executed by the processor 1001.

Figure 8:
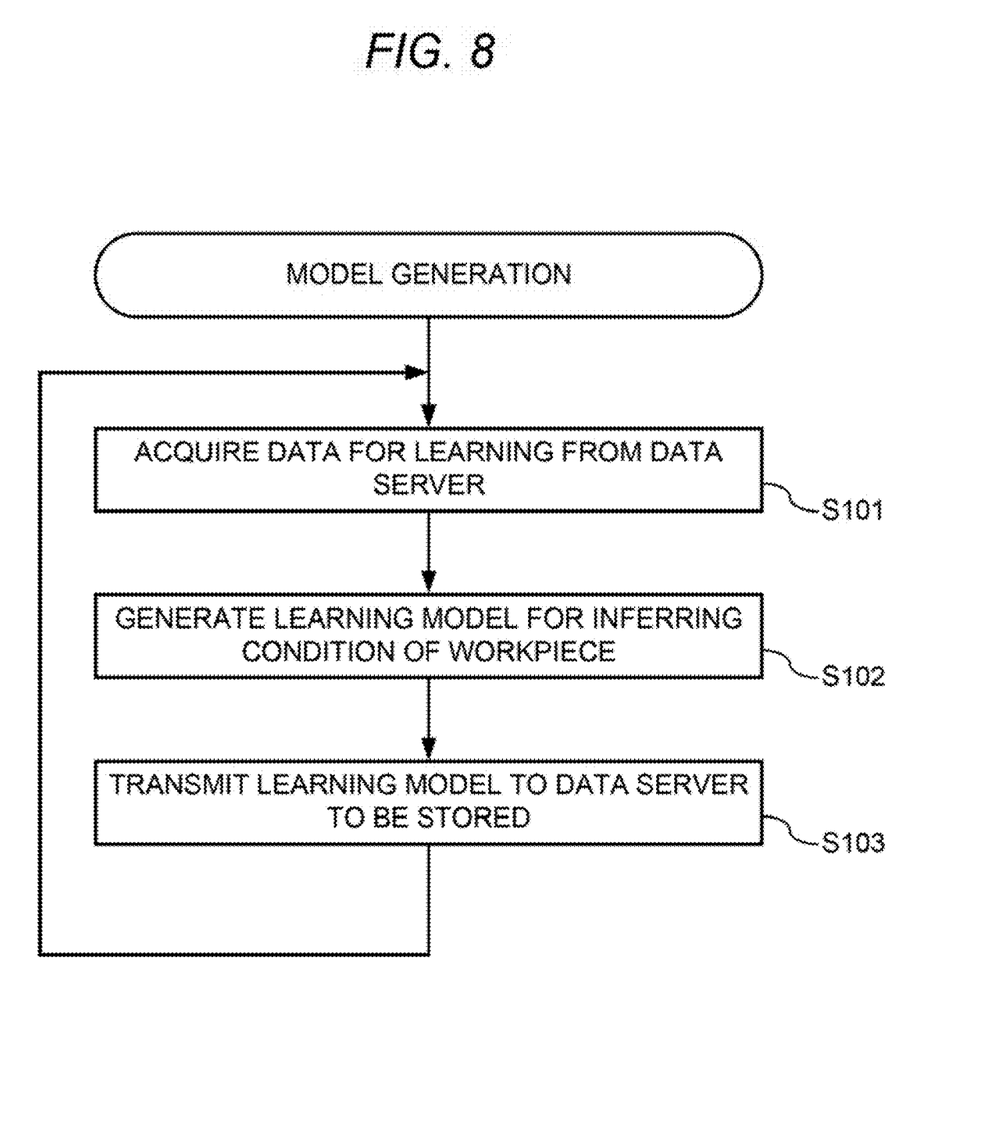
FIG. 8 is a flowchart illustrating an example model generation operation performed by the learning device according to Embodiment 1 of the present disclosure.

With reference to FIG. 8, an example of the model generation operation performed by the learning device 10 is described. The operation described in the example of the learning device 10 is started, for example, at the start of the learning device 10.

The data acquirer 12 in the learning device 10 acquires data for learning from the data server 30 (step S101). When sufficient data for learning is not stored in the data server 30, the data acquirer 12 waits until sufficient data for learning is added to the data server 30. The inspection device 7 inspects selected workpieces 3 handled in the production facility 2. Sufficient condition data may thus not be stored in the data server 30.

The model generator 13 in the learning device 10 generates a learning model for inferring that the condition of the workpiece is either acceptable or defective on the basis of the data for learning acquired in step S101 (step S102).

The model generator 13 transmits the learning model generated in step S102 to the data server 30 to be stored (step S103). The processing in step S101 and subsequent steps is then repeated.

Figure 9:
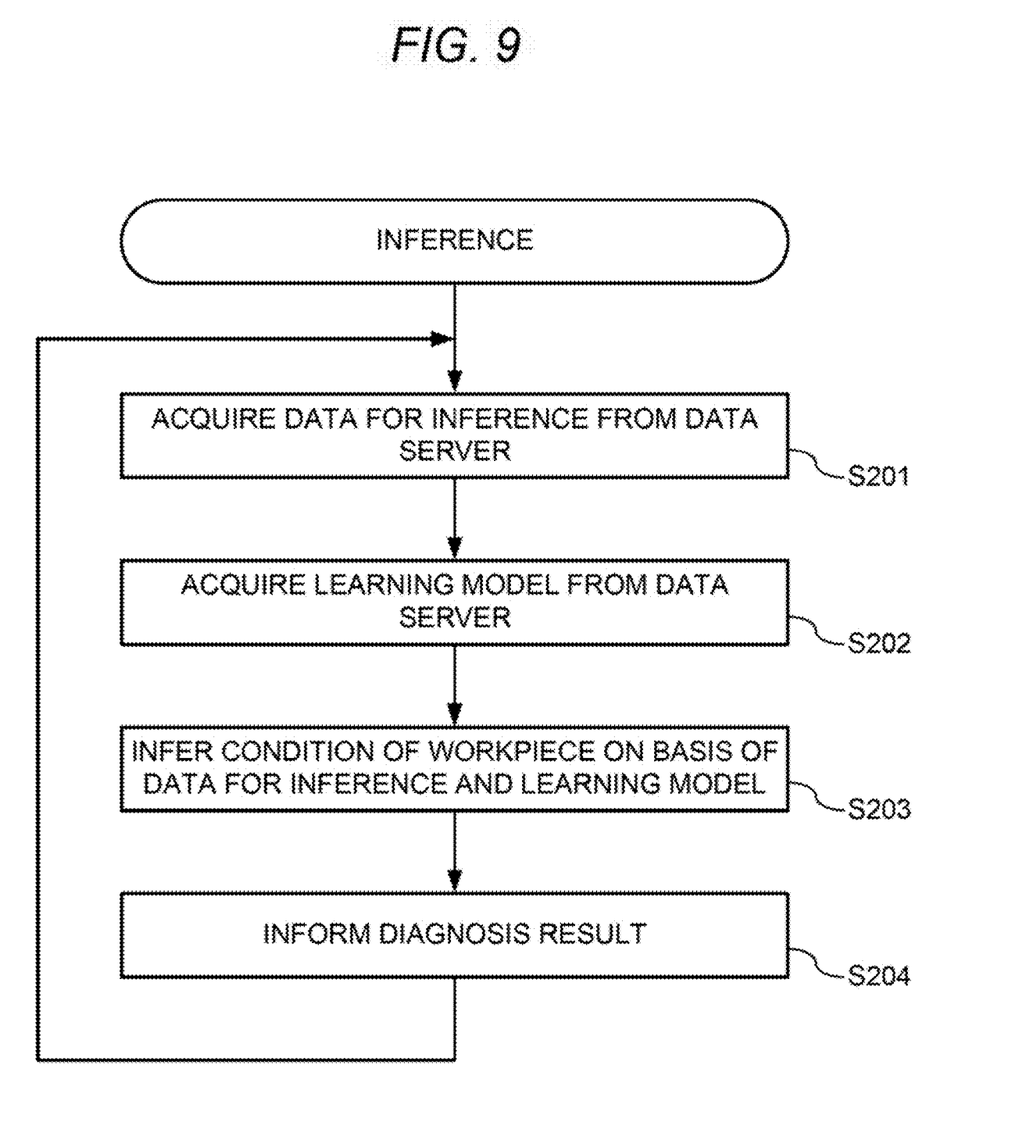
FIG. 9 is a flowchart illustrating an example inference operation performed by the inference device according to Embodiment 1 of the present disclosure.

With reference to FIG. 9, an example of the inference operation performed by the inference device 20 is described. The operation described in the example of the inference device 20 is started, for example, at the start of the inference device 20.

The data acquirer 22 in the inference device 20 acquires data for inference from the data server 30 (step S201). The data acquirer 22 then acquires the learning model stored by the learning device 10 into the data server 30 (step S202).

The inferrer 23 in the inference device 20 infers the condition of the workpiece 3 handled in the production facility 2 on the basis of the data for inference acquired in step S201 and the learning model acquired in step S202 (step S203).

The inferrer 23 controls the informer 24 to inform the user of the diagnosis result on the basis of the inference result in step S203 (step S204). The processing in step S201 and subsequent steps is then repeated.

The diagnostic system 1 according to Embodiment 1 is described above. The diagnostic system 1 according to Embodiment 1 allows the learning model for inferring that the condition of the workpiece 3 handled in the production facility 2 is either acceptable or defective to be generated with high accuracy because learning data is generated on the basis of the data for learning including the image data, the temperature data, and the distance data that is the data acquired through external observation of the production facility 2. The inference device 20 can accurately infer the condition of the workpieces 3 handled in the production facility 2 on the basis of the data for inference including the data acquired through external observation of the production facility 2 and the learning model generated with high accuracy. The diagnostic system 1 according to Embodiment 1 can associate the condition of the workpiece 3 with the normal or abnormal state of the production facility 2 to diagnose the production facility 2 with high accuracy.

Embodiment 2

A diagnostic system 1 according to Embodiment 2 is described below. The diagnostic system 1 according to Embodiment 2 differs from the system according to Embodiment 1 in that the diagnostic system 1 diagnoses the production facility 2 by inferring the deterioration state of the production facility 2 in addition to inferring the condition of the workpieces 3 handled in the production facility 2.

Figure 5:
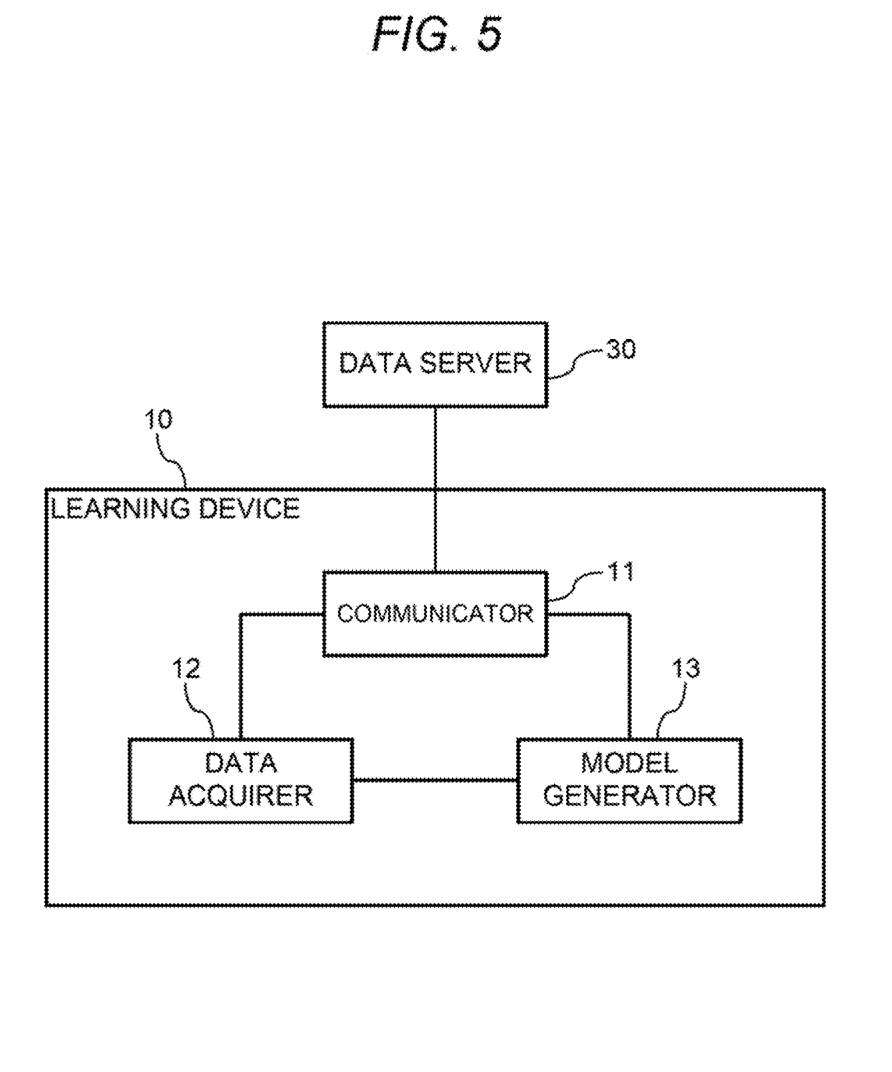
FIG. 5 is a functional block diagram of a learning device according to Embodiment 1 of the present disclosure.
Figure 6:
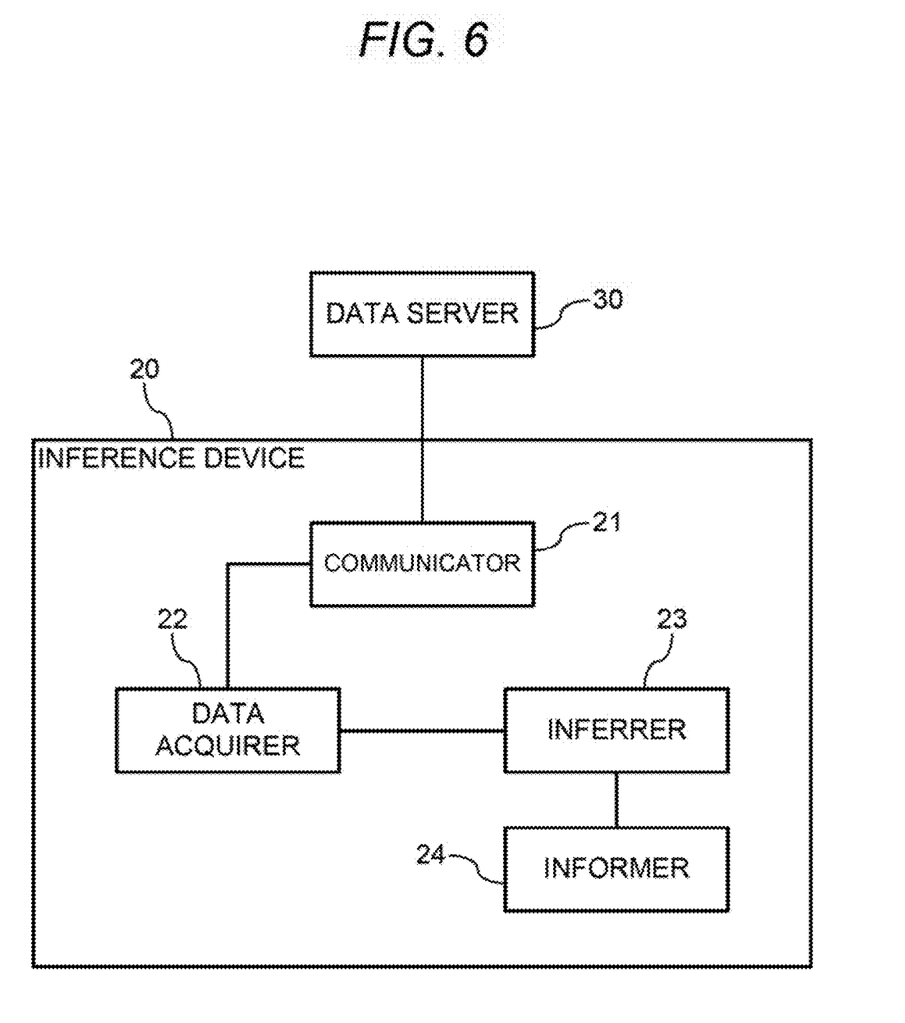
FIG. 6 is a functional block diagram of an inference device according to Embodiment 1 of the present disclosure.

The overall configuration of the diagnostic system 1, the functional components of the learning device 10, and the functional components of the inference device 20 are generally similar to those illustrated in FIGS. 1, 5, and 6, and thus the differences alone are described.

Figure 10:
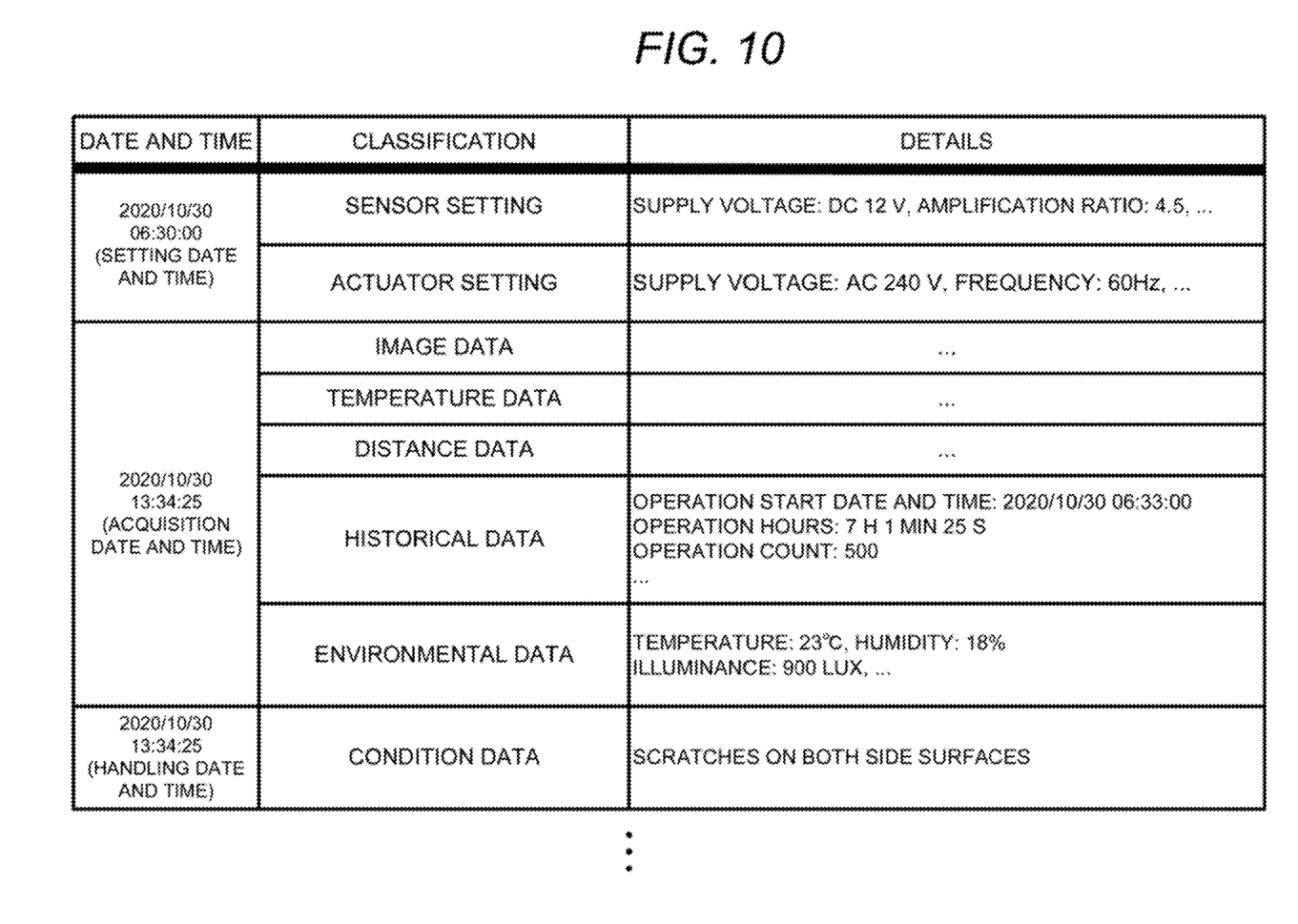
FIG. 10 is a diagram illustrating an example of data stored in a data server in Embodiment 2 of the present disclosure.

First, the diagnostic system 1 according to Embodiment 2 differs from the system according to Embodiment 1 in that the production facility 2 further transmits historical data indicating the operating history of the production facility 2 and environmental data indicating the installation environment of the production facility 2 to the data server 30, in addition to the setting data. The data stored in the data server 30 is illustrated in, for example, FIG. 10. The data for learning and the data for inference thus include the historical data and the environmental data, unlike the data in Embodiment 1.

The model generator 13 in the learning device 10 differs from the structure in Embodiment 1 in that the model generator 13 further generates the learning model for inferring the deterioration state of the production facility 2, in addition to the learning model for inferring the condition of the workpiece 3. The model generator 13 in Embodiment 2 can generate the learning model clustered in accordance with the deterioration state of the production facility 2, for example, by learning the data for learning further including the historical data and the environmental data through unsupervised learning. This is because the deterioration state of the production facility 2 has a correlation with the operating history and the installation environment.

When, for example, the production facility 2 includes components with a limited lifetime, such as bearings and rubber, the operation of the production facility 2 becomes unstable when such components wear out. Such an unstable operation is reflected in the image data and the distance data. In addition, when the components with a limited lifetime wear out, energy loss increases and the temperature of the production facility 2 increases. This temperature increase is reflected in the temperature data. Thus, the deterioration state of the production facility 2 has a correlation with the image data, the temperature data, and the distance data. The production facility 2 can deteriorate by a varying degree depending on the operating state and the installation environment of the production facility 2. Thus, the learning model can be generated to infer the deterioration state of the production facility 2 by generating the learning model on the basis of the data for learning including the image data, the temperature data, the distance data, the historical data, and the environmental data.

No major difference is expected in the deterioration state between the production facility 2 with a short operating history and not in a poor installation environment but with the workpiece 3 handled to be defective, and the production facility 2 with a long operating history and in a poor installation environment but with the workpiece 3 handled not to be defective. As in Embodiment 1, the data for learning thus includes setting data, image data, temperature data, distance data, and condition data. This can generate a more accurate model than simply generating a learning model on the basis of the historical data and the environmental data alone.

The inferrer 23 in the inference device 20 differs from the structure in Embodiment 1 in that the inferrer 23 also infers the deterioration state of the production facility 2 on the basis of the data for inference further including the historical data and the environmental data and the learning model for inferring the deterioration state of the production facility 2 generated by the learning device 10. The inferrer 23 in the inference device 20 controls the informer 24 to inform the user of information indicating the deterioration state of the production facility 2 as the diagnosis result.

The diagnostic system 1 according to Embodiment 2 is described above. In the diagnostic system 1 according to Embodiment 2, the data for learning and the data for inference further include historical data and environmental data to allow accurate diagnosis of the deterioration state of the production facility 2 with the configuration substantially similar to the system according to Embodiment 1.

Modifications In each of the above embodiments, various sets of data are to be transmitted to and stored in the data server 30. However, the data server 30 may be eliminated. For example, the diagnostic system 1 may not include the data server 30, and the setting data, the image data, the temperature data, the distance data, and the condition data may be transmitted directly to the learning device 10 and the inference device 20, and the learning model may be transmitted directly from the learning device 10 to the inference device 20.

The learning device 10, the inference device 20, and the data server 30 are on the same network in each of the above embodiments. The learning device 10, the inference device 20, and the data server 30 may be on a different network. For example, the learning device 10 and the inference device 20 may be on the factory network, and the data server 30 may be on the Internet.

In the hardware configuration illustrated in FIG. 7, the learning device 10 and the inference device 20 each include the secondary storage device 1004. However, the hardware configuration is not limited to this. The secondary storage device 1004 may be external to the learning device 10 or the inference device 20, and the learning device 10 and the inference device 20 may be connected to the secondary storage device 1004 through the interface 1003. In this embodiment, a removable medium such as a USB flash drive or a memory card may also be used as the secondary storage device 1004.

Instead of the hardware configuration illustrated in FIG. 7, a dedicated circuit using a component, such as an application-specific integrated circuit (ASIC) or a field-programmable gate array (FPGA), may be used to form the learning device 10 and the inference device 20. In the hardware configuration illustrated in FIG. 7, some of the functions of the learning device 10 and the inference device 20 may be implemented by, for example, a dedicated circuit connected to the interface 1003.

The programs used by the learning device 10 and the inference device 20 may be stored in a non-transitory computer-readable recording medium, such as compact disc read-only memory (CD-ROM), a digital versatile disc (DVD), a USB flash drive, a memory card, and an HDD, and may then be distributed. Such programs may be installed on a specific or general-purpose computer, and the computer may then function as the learning device 10 and the inference device 20.

The programs described above may be stored in a storage device in another server on the Internet and may then be downloaded from the server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Diagnostic system
2 Production facility
3 Workpiece
4 Camera
5 Temperature sensor
6 Range sensor
7 Inspection device
10 Learning device
11 Communicator
12 Data acquirer
13 Model generator
20 Inference device
21 Communicator
22 Data acquirer
23 Inferrer
24 Informer
30 Data server
1000 Bus
1001 Processor
1002 Memory
1003 Interface
1004 Secondary storage device
F Production site

The invention claimed is:

1. A diagnostic system, comprising:
a production facility configured to produce setting data, the production facility including a robotic arm to grip and transport a workpiece;
an imaging device configured to produce image data of the production facility;
a temperature sensor configured to produce temperature data indicating a surface temperature of the production facility;
a range sensor configured to produce distance data indicating a distance from the range sensor to the production facility; and
a learning device including first circuitry to:
communicate with the production facility, the imaging device, the temperature sensor and the range sensor to acquire data for learning, the data for learning including (i) setting data indicating a setting of the production facility, the production facility including a robotic arm to grip and transport a workpiece, (ii) image data indicating an image of the production facility captured by the imaging device, (iii) temperature data indicating a surface temperature of the production facility measured by the temperature sensor, (iv) distance data indicating a distance from the range sensor to the production facility measured by the range sensor, and (v) condition data indicating a condition of the workpiece handled in the production facility, and
generate a learning model for inferring the condition of the workpiece handled in the production facility through machine learning, on the data for learning to identify correlations between the setting data, image data, temperature data, distance data, and condition data, the temperature data including data indicating a surface temperature of a part of contact of the robotic arm and the workpiece in a condition where the robotic arm grips the workpiece, the surface temperature being indicative of frictional heat generated due to an abnormality in the robotic arm's operation.

2. The diagnostic system according to claim 1, wherein
the data for learning further includes historical data indicating an operating history of the production facility and environmental data indicating an installation environment of the production facility, and
the first circuitry further generates a learning model for inferring a deterioration state of the production facility on basis of the data for learning.

3. The diagnostic system according to claim 1, further comprising:
an inference device comprising second circuitry to
acquire data for inference from the production facility, the imaging device, the temperature sensor and the range sensor, the data forinferenceincluding (i) the setting data indicating a setting of the production facility, (ii) the image data, (iii) the temperature data, and (iv) the distance data, and
infer a condition of a workpiece handled in the production facility on basis of the learning model generated by the learning device and the data for inference, wherein the temperature data includes data indicating a surface temperature of a part of contact of the robotic arm and the workpiece in a condition where the robotic arm grips the workpiece.

4. A model generation method, comprising:
producing, by a production facility, setting data indicating a setting of the production facility, the production facility including a robotic arm to grip and transport a workpiece
producing, by an imaging device, image data of the production facility;
producing, by a temperature sensor, temperature data indicating a surface temperature of the production facility;
producing, by a range sensor; distance data indicating a distance from the range sensor to the production facility;
acquiring data for learning, the data forlearningincluding (i) the setting data, (ii) the image data, (iii) the temperature data, (iv) the distance data, and (v) condition data indicating a condition of the workpiece handled in the production facility; and
generating a learning model for inferring the condition of the workpiece handled in the production facility through machine learning, on the data for learning to identify correlations between the setting data, image data, temperature data, distance data, and condition data, wherein the temperature data includes data indicating a surface temperature of a part of contact of the robotic arm and the workpiece in a condition where the robotic arm grips the workpiece, the surface temperature being indicative of frictional heat generated due to an abnormality in the robotic arm's operation.

5. The model generation method according to claim 4, wherein the data for learning further includes historical data indicating an operating history of the production facility and environmental data indicating an installation environment of the production facility, and the generating includes generating a learning model for inferring a deterioration state of the production facility on basis of the data for learning.

* * * * *